United States Patent [19]

Warmuth, II

[11] Patent Number: 4,629,170
[45] Date of Patent: Dec. 16, 1986

[54] DUAL CHAMBER AIR SPRING

[75] Inventor: Ivan J. Warmuth, II, Akron, Ohio

[73] Assignee: The Goodyear Tire & Rubber Company, Akron, Ohio

[21] Appl. No.: 626,365

[22] Filed: Jun. 29, 1984

[51] Int. Cl.⁴ .............................................. F16F 9/04
[52] U.S. Cl. ............................ 267/64.27; 267/64.21; 267/64.24; 267/64.25
[58] Field of Search ................ 267/8 R, 64.19, 64.21, 267/64.23, 64.24, 64.27, 118, 121, 122, 152, 64.25; 92/98.0, 35, 37, 39, 48; 74/18.2; 280/711; 91/509

[56] References Cited

U.S. PATENT DOCUMENTS

| | | | |
|---|---|---|---|
| 2,995,355 | 8/1961 | Stump | 267/64.27 |
| 3,000,625 | 9/1961 | Polhemus | 267/64.24 |
| 3,580,557 | 5/1971 | Dean | 267/34 X |
| 3,627,297 | 12/1971 | Gaydecki | 267/64.24 X |
| 3,627,298 | 12/1971 | Gaydecki | 267/64.24 X |
| 3,777,625 | 12/1973 | Andres | 92/48 |
| 3,980,316 | 9/1976 | Yates | 267/64.27 X |
| 4,200,270 | 4/1980 | Merkle | 267/64.24 |
| 4,273,358 | 6/1981 | Taft | 280/708 |
| 4,295,635 | 10/1981 | Pustka et al. | 254/93 HP |
| 4,325,541 | 4/1982 | Korosladanyi et al. | 267/8 R |
| 4,378,935 | 4/1983 | Brown et al. | 267/64.27 |
| 4,447,047 | 5/1984 | Newell | 267/118 |

Primary Examiner—Douglas C. Butler
Assistant Examiner—Richard R. Diefendorf
Attorney, Agent, or Firm—R. D. Thompson

[57] ABSTRACT

A pneumatic spring 10 with inner 20 and outer 22 chambers which may be pressurized independently to give variable spring rates which are independent of load carrying capacity of the spring. The chambers 20, 22 are formed by gas-impervious membranes 16, 18 sealably attached to an axially spaced apart retainer 12 and piston 14. The effective diameter of the inner chamber is greater than the outer chamber allowing the spring to exert compressive or extensive force depending upon pressures in the chambers. The spring 10 may be used as a vehicle suspension component.

11 Claims, 10 Drawing Figures

DUAL CHAMBER AIR SPRING

BACKGROUND OF THE INVENTION

This invention generally relates to pneumatic springs and more particularly to an improved air spring having the capability of being dual acting, that is, being capable of providing both compression or extension forces. This invention is particularly useful in automotive and truck suspension applications where it may be desirable to change the spring rate of the air spring independent of the load being supported by the air spring. It is also useable to lift axle suspensions when such suspension members are unneeded for support and still provide the load carrying capability when the axle is in use. It is also used to provide positive driving force in both the compression and extension directions as in mechanical servo actuators.

BACKGROUND ART

Conventional air springs as are well known in the art function as a load support member. Spring rate may be changed by altering the pressure in a conventional one chamber air spring, but that change in spring rate also changes the load carrying capability of the air spring. Thus, if the spring rate is altered, at a constant load, the degree of extension of height of the air spring will be altered as well. In an automotive or truck suspension application, this means the height of the sprung suspension member will be increased as the spring rate is increased through the addition of air pressure. This dependency of spring rate and load is undesirable since the suspension dynamics are altered by a change in the resting height of the sprung components of the suspension.

One method of circumventing this dependency of spring rate to load in a conventional one chamber air spring has been to introduce an external volume reservoir to the air spring system. When a change in spring rate is desired, the volume reservoir is connected to the air spring chamber to temporarily alter the apparent volume of the air spring and thus change the spring rate. These external volume reservoirs suffer from two major disadvantages. First, they are too bulky and space intensive to be located close to the suspension component on which the air spring is utilized. Second, it has been found that locating the volume reservoir at some distance more convenient has decreased or nearly eliminated the spring rate differential capability due to the air flow restrictions which are encountered in the conduit which connects the distant reservoir to the air spring in the suspension member. The air flow restrictions decrease the actual spring rate changes which can be effected using a conventional one chamber air spring with an external reservoir.

In view of these and other problems associated with presently known air spring configurations, one advantage of this invention is that an air spring is provided with the capability of changing the spring rate without a change in load bearing capacity. Another advantage of the present invention is that double acting capability may be realized by the use of a dual chamber air spring of this invention, wherein the air spring may be used to exert compression or extension forces. A further advantage is that the air spring of this invention offers a space efficient package which may be utilized in limited space suspension applications. An additional advantage is that this air spring is nearly instantaneously responsive to a requirement for a change in spring rate, thus overcoming disadvantages of known air spring configurations. These advantages are accomplished by an air spring comprising: (a) an upper retainer; (b) a piston spaced axially away from the upper retainer; (c) an inner gas impervious membrane having tubular shape sealingly attached to the retainer and to the piston to form an inner cavity; (d) an outer gas impervious membrane having tubular shape of larger diameter than the inner member sealingly attached to the retainer and the piston such that the inner member is completely encased by the outer member, thus forming an outer cavity between the outer member and inner member; (e) means for introducing gas pressure to at least one of said inner and outer cavities.

BRIEF DESCRIPTION OF THE DRAWINGS

The features and advantages of the invention will be better understood from a consideration of the following description when taken in conjunction with the accompanying drawings.

DETAILED DESCRIPTION OF THE INVENTION

Figure 1:
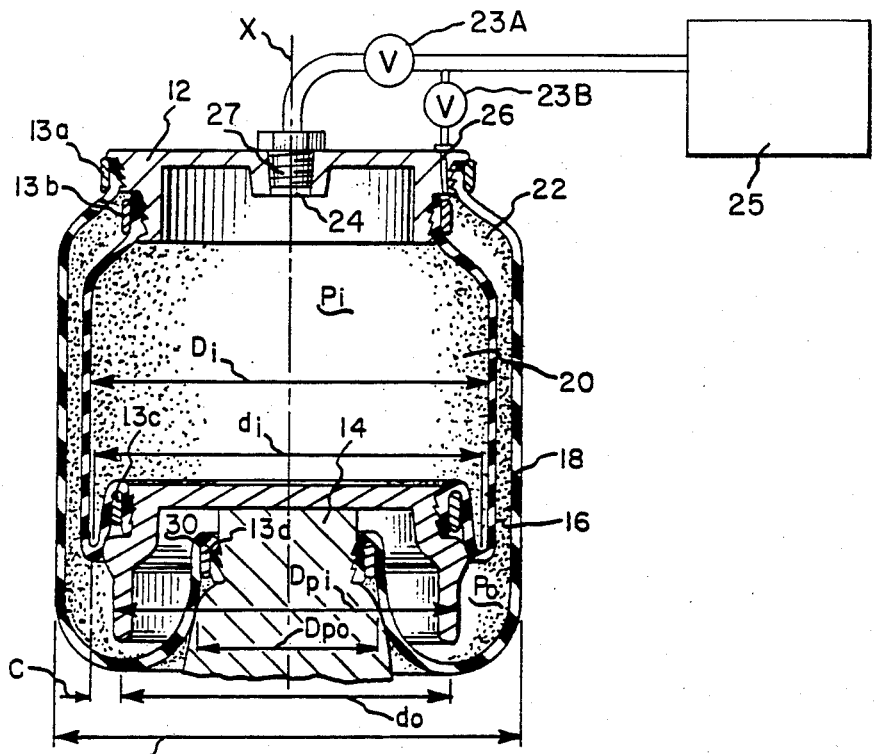
FIG. 1 is a dual chamber air spring of this invention in cross section.

Referring to FIG. 1 of the drawings, a dual chamber air spring, according to this invention, is generally indicated by reference numeral 10. An upper retainer 12 and a piston 14 are shown spaced axially apart with the air spring 10 in a substantially extended position. The inner membrane 16 is sealingly attached to the lower portion of retainer 12 and upper portion of piston 14. The outer membrane 18 is sealingly attached to the lower portion of piston 14 and the upper portion of retainer 12. The enclosure formed between the retainer 12, piston 14 and inner membrane will be described as the inner chamber 20. Similarly, the outer membrane 18 with the piston 14 and retainer 12 form the outer chamber 22.

The preferred embodiment of FIG. 1 illustrates an air spring 10 as basically one rolling lobe air spring set within another rolling lobe air spring. The inner membrane 16 and outer membrane 18 may be formed according to any construction conventionally known in the air spring art. These membranes must be air impervious. The inner membrane 16 and outer membrane 18 may both be radially flexible for applications where the pressure (gauge) of inner chamber Pi is always greater than the pressure (gauge) of the outer chamber Po. This is the general case when the air spring is used for its variable spring rate characteristics.

When Po is greater than Pi the inner membrane 16 must be constructed to be capable of resisting radial compressive force. The inner membrane may be a rigid sleeve fitted with means for containing air pressure or a flexible sleeve with means for resisting radial forces such as a plastic or wire helix incorporated to the membrane. In this configuration the air spring can exert either compression or extension force and will hereafter be referred to as the dual acting air spring embodiment. The membranes may be elastomeric materials, preferably reinforced by textile or wire fabric members. Depending upon the degree of expansion which can be tolerated, the bias angles of the reinforcing fabric within the inner membrane 16 and outer membrane 18 may be varied according to the particular pressure ranges and other engineering constraints of the application. The inner and outer membranes 16 and 18, respectively, are formed into tubular reinforced fabric sleeves, commonly of various types of synthetic or natural rubber polymers which may be vulcanized either by heat or radiation curing methods to form tough air or gas impermeable barriers. The membrane may also be composed of air impervious plastics having suitable flex life characteristics. The plastic may optionally have fabric reinforcement imbedded in the membrane.

FIG. 1 shows one representative means of attaching the inner and outer membranes to the retainer and piston. The method shown is one in which a serrated cylindrical surface is provided on the appropriate portion of the retainer 12 or piston 14 to accommodate the extreme end of the inner or outer membrane. The axial end of the membrane is compressed between the serrated surface of the solid member and a retaining ring 13(a), 13(b), 13(c) and 13(d). The retaining rings may be swage-fitted or tightened by any of several commonly used methods for bringing the retaining rings in radial compression against the extreme axial ends of the membranes. Other means for sealingly attaching the membrane include constructing the membranes with internally molded beads and using a press fit like that commonly employed in tire mounting designs.

In order to take full advantage of the unique and useful characteristics of the air spring of this invention, it is necessary to have the capability of adjusting the internal pressure in the inner chamber 20 or the outer chamber 22 while holding the other chamber pressure constant. In a preferred mode of using this air spring, the inner chamber 20 and outer chamber 22 may have continuously variable independent pressure within each respective chamber. The air spring must therefore be fitted with suitable means for allowing the intake and exhaust of pressurized air. FIG. 1 shows the preferred form of the air spring in which the retainer contains apertures therethrough for an inner chamber gas port 24 and an outer chamber gas port 26 which both allow the intake and exhaust of gas through the ports. Of course, it is to be appreciated that both gas ports may not be necessary for a particular application if either the inner chamber or outer chamber is to be held at a fixed pressure. Valves of suitable design such as two way valves 23a, 23b are fitted to the gas ports 24 and 26 to allow for appropriate flow of gas. The ports 24 and 26 are connected to an external variable gas pressure source 25 which may be constituted of one or more compressors having suitable sensors 27 and control modules for effecting flow of pressurized air into the inner and outer chamber as demanded. While the inner chamber gas port 24 and outer chamber gas port 26 are shown in FIG. 1 as being fitted in the retainer, it is to be appreciated that any positioning of the ports to allow access into one or both cavities may be used. For instance, the gas ports may be through the piston if the particular application would be compatible with such a pressure system.

Figure 2:
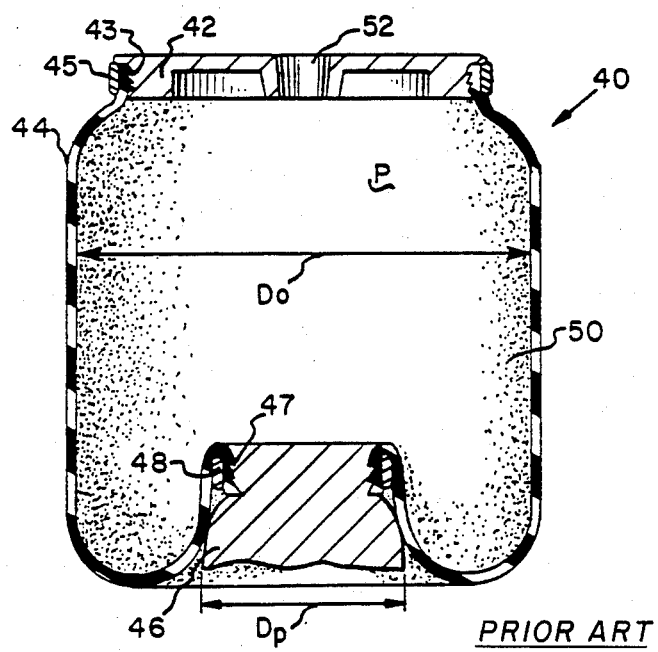
FIG. 2—conventional air spring of the prior art in cross section.

FIG. 2 illustrates a conventional air spring of the prior art, generally referred to using reference numeral 40. The configuration described is commonly referred to as a rolling lobe air spring. It includes an upper plate 42 which is adapted by suitable means such as serrations 43 for attachment of the gas impervious sleeve 44. The sleeve 44 is a reinforced flexible member of generally tubular form prior to assembly into the air spring. The sleeve 44 is attached to upper plate 42 by a conventional means for attachment such as an upper swage ring 45. The sleeve 44 is sealingly attached at the end opposite from the upper plate to a piston 46 which similarly has attachment means such as serrations suitable for airtight attachment of sleeve 44 to the piston 46. Piston serrations 47 are shown as a representative means for such attachment utilizing a lower swage ring 48. Once the sleeve is sealingly attached to the upper plate 42 and the piston 46, a working cavity 50 is formed. Although the cavity may be sealed to contain a given pressure of gas, the conventional air spring more typically has an air inlet 52 which allows for pressurization changes within the cavity 50. The support capability of the air spring is a function of the piston diameter $D_p$ and the outer sleeve diameter $D_o$. In general, the load bearing capability of the spring is expressed by Equation #1.

$$F = PA \qquad \text{Equation \#1}$$

where
F = Force or Load
P = Gauge Pressure
A = Effective Area
This can be approximated by $$F = \frac{ZP\pi}{4}\left(\frac{D_p + D_o^2}{2}\right)$$

where
F = Force or Load
P = Gauge Pressure
$D_p$ = Piston Diameter
$D_o$ = Sleeve Diameter
Z = Effective Diameter Correction Factor The spring rate of a conventional air spring can be shown to be $$\text{Rate} = \frac{dF}{dX} = \frac{nPaA^2}{V} + Pg\frac{dA}{dX} \qquad \text{Equation \#2}$$

where
n = Polytropic Process Exponent
Pa = Absolute Pressure
A = Effective Area
V = Volume
Pg = Gauge Pressure The unique performance characteristics of the air spring 10 of this invention derive from differential force vectors which arise due to differences in effective diameter between the inner chamber 20 and outer chamber 22 of the air spring 10. The effective diameter is a term which describes the actual diameter over which the pressure in the air spring acts.

In FIG. 1, the effective diameter of the inner cavity $d_i$ is described by the lowest axial extent of the inner membrane 16 when the air spring 10 is in equilibrium and at rest. The term "lowest" is given with reference to the piston end of the spring 10. It is recognized that the lowest internal point would trace a circular path, and the inner diameter $d_i$ is the diameter of that circular path. The effective diameter of the outer sleeve $d_o$ is similarly determined by the lowest axial point of the outer lobe 23 of the outer membrane 18. The overall diameter of the outer chamber is expressed by $D_o$, and the overall diameter of the inner chamber is expressed by $D_i$. It is to be appreciated that as the retainer 12 moves axially toward the piston 14 the inner membrane 16 and outer membrane 18 roll downward over the outer surface of the piston to form a meniscus or rolling lobe. The effective area of each chamber is determined to be the area which lies radially inside of the lowest point of the meniscus or lobe. Alternatively, it is the diameter of the locus of points of the membrane which are axially most distant from the upper retainer. The effective diameter is twice the distance from the air spring centerline X to the meniscus.

In the preferred embodiment of this invention shown in FIG. 1, the effective diameter of the inner chamber $d_i$ is greater than the effective diameter of the outer chamber $d_o$. This relationship of the relative effective diameters of the inner and outer chamber of the air spring 10 gives rise to an air spring which is capable of supporting a load in the same manner as a conventional air spring 40 shown in FIG. 2, but the air spring 10 can further have a variable spring rate which is independent of the load by adjustment of pressures in the inner and outer chambers. The outer chamber gauge pressure $P_o$ and the inner chamber gauge pressure $P_i$ may be varied to effect a substantially different spring rate despite an equal load carrying capacity.

Figure 3:
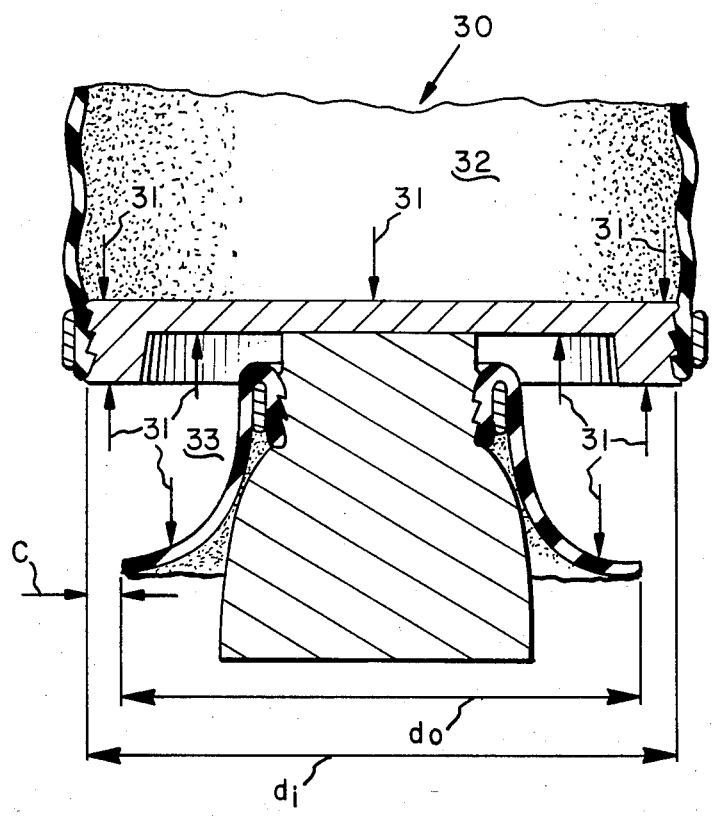
FIG. 3—free body representation of portions of dual chamber air spring in cross section.

FIG. 3 is a generalized representation of a free body diagram of the air spring 30 of this invention. The free body diagram shows only the axial components of the pressure vectors 31 in the spring 30. The radial components of the pressure vectors balance each other and are not shown. The inner chamber 32 has an effective diameter $d_i$ which spans the effective area over which the pressure acts. The outer chamber 33 has an effective diameter $d_o$. In a preferred embodiment, the dual-acting air spring, $d_i$ is greater than $d_o$ as shown in FIG. 3. Thus, the pressure in the inner cavity is acting over a greater effective area than the pressure in the outer cavity. This differential in effective diameters creates an axial force which acts over the annular area shown in cross section as C in FIGS. 1 and 3. This feature gives the air spring of this invention the ability to (1) exert either compression or extension forces or (2) have a variable spring rate by the simple selection of appropriate pressures in the two cavities. These abilities are heretofore unknown in a pneumatic spring.

The force equation which describes the axial expansion force in the air spring 10 shown in FIG. 1 is the following:

$$F = P_i A_i - P_o(A_i - A_o) \qquad \text{Equation \#3}$$

or $$F = \frac{P_i \pi}{4} d_i^2 - \frac{P_o \pi}{4} (d_i^2 - d_o^2)$$

where
F = Force or Load
$P_i$ = Inner Chamber Pressure
$P_o$ = Outer Chamber Pressure
$A_i$ = Inner Chamber Effective Area
$A_o$ = Outer Chamber Effective Area
$d_i$ = Inner Chamber Effective Diameter
$d_o$ = Outer Chamber Effective Diameter This can be approximated by $$F = \frac{ZP_i\pi}{4}\left(\frac{D_i + D_{pi}^2}{2}\right) - \frac{ZP_o\pi}{4}\left[\left(\frac{D_i + D_{pi}^2}{2}\right) - \left(\frac{D_o + D_{po}^2}{2}\right)\right]$$

where
$D_i$ = Inner Chamber Diameter
$D_{pi}$ = Inner Piston Diameter
$D_o$ = Outer Chamber Diameter
$D_{po}$ = Outer Piston Diameter
Z = Effective Diameter Correction Factor The spring rate of the air spring 10 can be expressed mathematically as follows:

$$\text{Rate} = \frac{dF}{dx} = \frac{nP_{ia}A_i^2}{V_i} + P_{ig}\frac{dA_i}{dx} - \frac{nP_{oa}A_o}{V_o}(A_i - A_o) - P_{og}\frac{dA_i}{dx} + \frac{P_{og}dA}{dx}.$$

and simplifying by assuming a cylindrical piston yields to the more useful form:

$$\text{Rate} = \frac{nP_{ia}A_i^2}{V_i} - \frac{nP_{oa}A_o}{V_o}(A_i - A_o) \qquad \text{Equation \#4}$$

where
n = Polytropic Process Exponent
$P_{ia}$ = Absolute Pressure of Inner Chamber
$P_{ig}$ = Gauge Pressure of Inner Chamber
$P_{oa}$ = Absolute Pressure of Outer Chamber
$P_{og}$ = Gauge Pressure of Outer Chamber
$V_i$ = Volume of Inner Chamber
$V_o$ = Volume of Outer Chamber
$A_i$ = Inner Chamber Effective Area
$A_o$ = Outer Chamber Effective Area Equation #4 shows the critical influence of effective area, pressure, and volume in the airspring of this invention.

Comparison of the force expression of Equation #3 for the air spring of this invention with Equation #1 for conventional air spring of FIG. 2 clearly shows that a constant load or force can be maintained in this dual chamber air spring by varying the pressure of the inner chamber and the pressure of the outer chamber over reasonable design limit ranges. Similarly, comparison of Equation #4 with Equation #2 reveals that the spring rate of this dual chamber air spring can be varied independently of load bearing capacity which is not possible with conventional air springs as revealed in Equation #2. The spring rate is directly proportional to pressure in the conventional air spring. The advantage of this flexibility is that the spring rate of the air spring differs depending upon the relationship of the inner and outer cavity pressures while the load bearing capability of the spring can be maintained at a constant. This combination of capabilities is heretofore unknown in a pneumatic spring.

Figure 4:
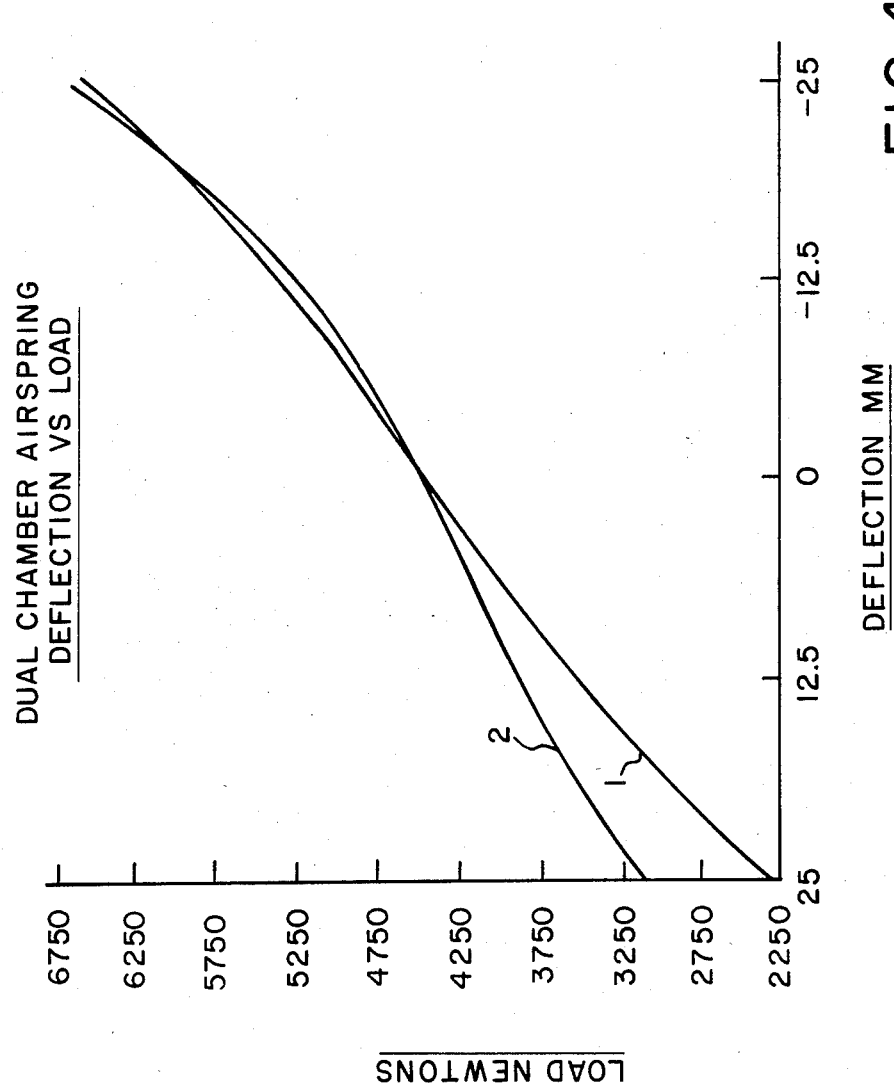
FIG. 4—load versus deflection curves-dual chamber air spring.
Figure 5:
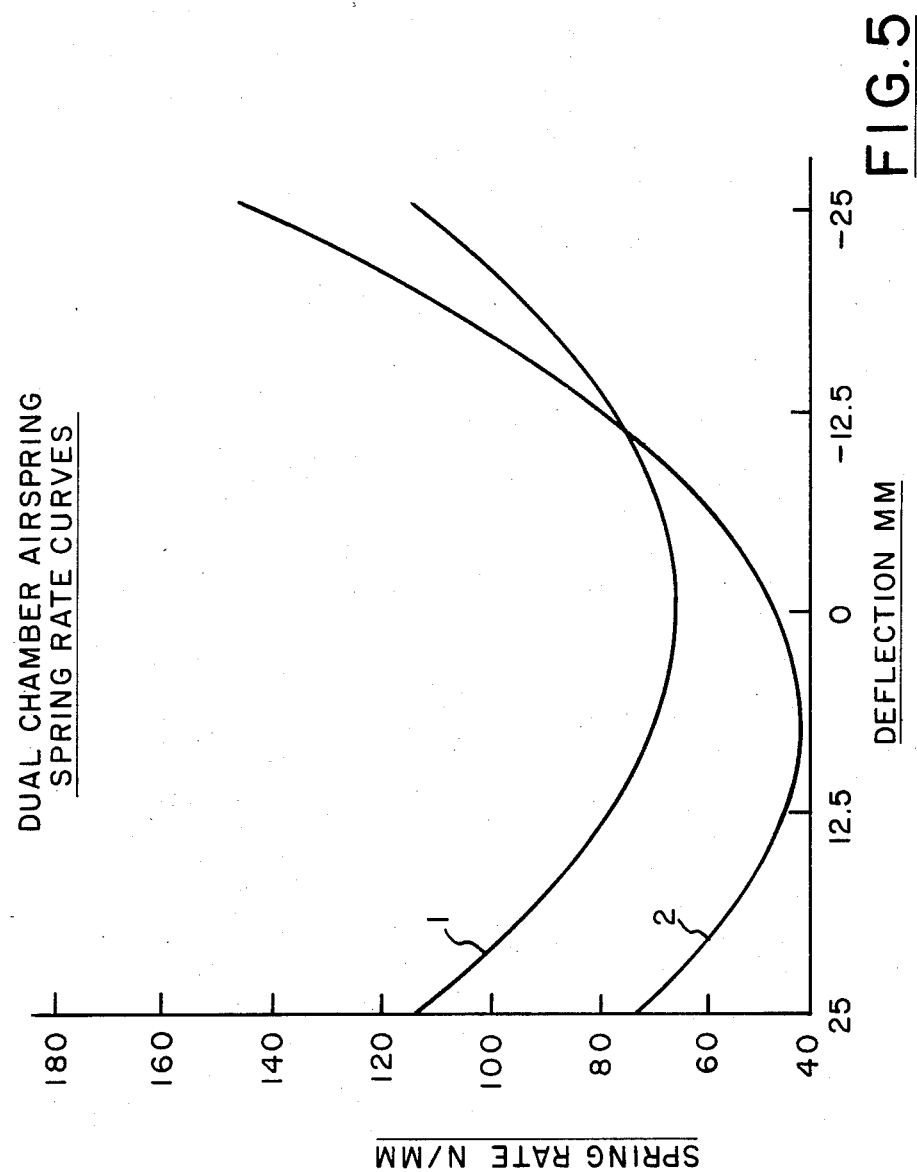
FIG. 5—spring rate curves—dual chamber air spring.

TABLE I
DUAL CHAMBER AIR SPRING CHARACTERISTICS AND TESTING PARAMETERS
For Table II, FIG. 4 and FIG. 5

| Load Range | 8896 (NEWTONS) |
| --- | --- |
| Pressure Range | 1724 (KPa) |
| Stroke Range | 102 (MM) |
| Stroke Amplitude | 51 (MM) |
| Jounce | 25 (MM) |
| Rebound | 25 (MM) |
| Test Frequency | .5 (HZ) |
| Stroke Control | RAMP |
| Data Sampling Time | 10 (MSECS) |
| Design Height, DH | 254 (MM) |

TABLE II

| | Units | Test 1 | Test 2 |
| --- | --- | --- | --- |
| Load @ Design Height | (N) | 4450 | 4450 |
| Natural Frequency* | (HZ) | 1.98 | 1.70 |
| Spring Rate @ Cycle 2 | (N/MM) | 70.2 | 52 |
| Inner Chamber Pressure at DH | (KPa) | 507 | 556 |
| Outer Chamber Pressure at DH | (KPa) | 207 | 413 |
| Effective Area @ DH | (SQ MM) | 8771 | 8004 |

*Natural Frequency = $15.76 \times (K/L)^{\frac{1}{2}}$ in cycles per second where K = Newtons per mm and L = newtons

TEST METHOD FOR TABLES I–VI AND FIGS. 4–9

The air spring to be tested was cycled on an MTS hydraulic loading machine in the following manner: The air spring was fixtured at design height and pressure in the MTS closed-loop dynamic response tester. The hydraulic ram was programmed to stroke the spring through a predetermined amplitude at 0.5 HZ. A load cell, a pressure transducer, and a height sensor were used to monitor spring force, internal pressure, and spring height every 10 milli-seconds during the test sequence. This information was stored in the control micro-processor memory and was used to calculate the data shown in Tables II, IV and VI and graphically set out in FIGS. 4–9.

Variable Rate Spring Embodiment

A pneumatic spring of this invention similar in all respects to the air spring of FIG. 1, except that the air inlet 26 was located in the piston 14 having an internal port in communication with the outer chamber 22, was dynamically tested to determine spring rate characteristics. Table I shows the design characteristics of the dual chamber spring which was tested. FIG. 4 shows the load vs. deflection curves for the air spring described in Table I when it was cycled at varying inner and outer chamber pressures adjusted to maintain nearly identical load capacity. Table II further details the two test conditions which were utilized to generate the curves of FIG. 4. The design height and load were maintained as constants by adjusting the inner chamber and outer chamber pressures. Table II and FIG. 4 clearly show that at the design height, the spring rate of the same air spring in tests 1 and 2 is completely different. The spring rate shown in Table II for each of the two tests represents the rate of change of the load deflection curve at plus or minus 10 mm of stroke from design height. FIG. 5 shows the spring rate curves for the test 1 and test 2 which are the differential curves of the curves in FIG. 4.

Conventional Air Spring Test Results

A conventional air spring of the configuration shown in FIG. 2 having the design parameters shown in Table III below was tested identically with the air spring of this invention shown in Table I to illustrate that the spring rate of a conventional air spring is not independent of the load.

Figure 6:
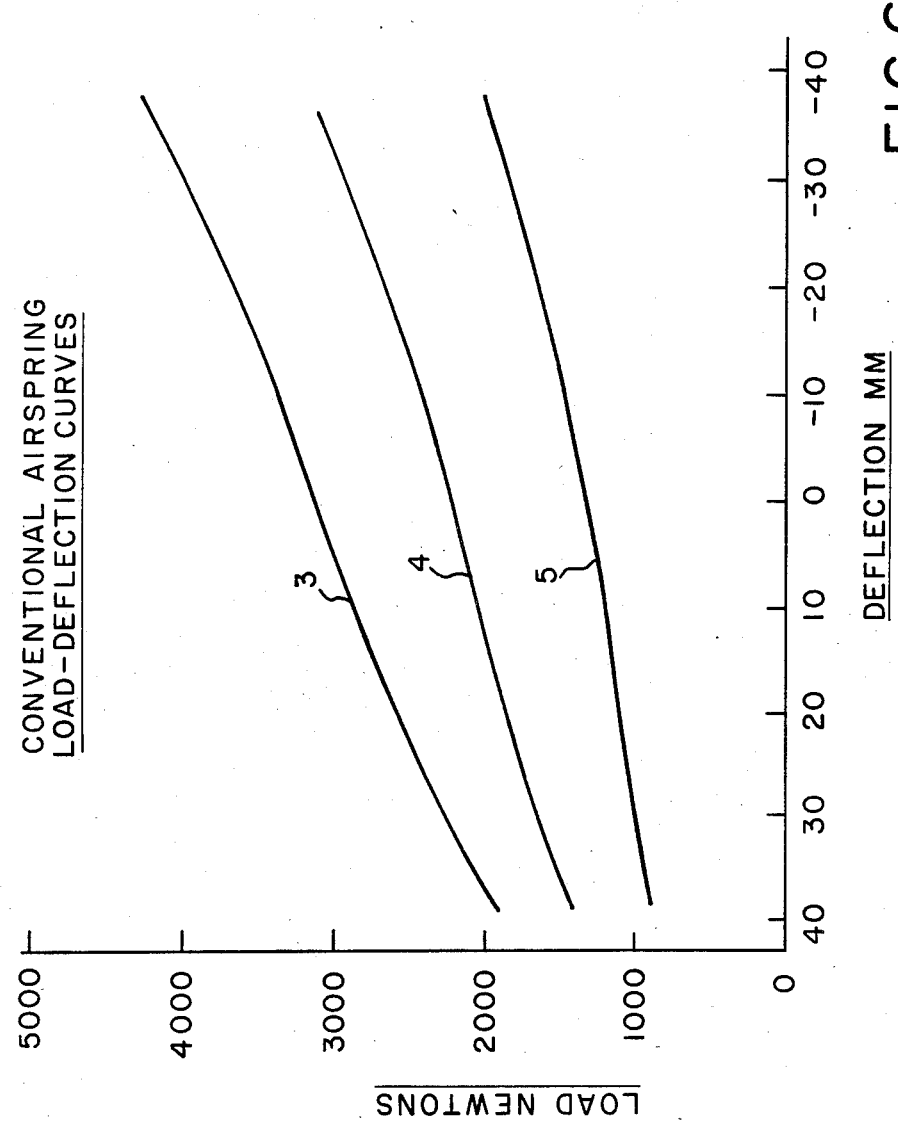
FIG. 6—load deflection curves—conventional air spring.
Figure 7:
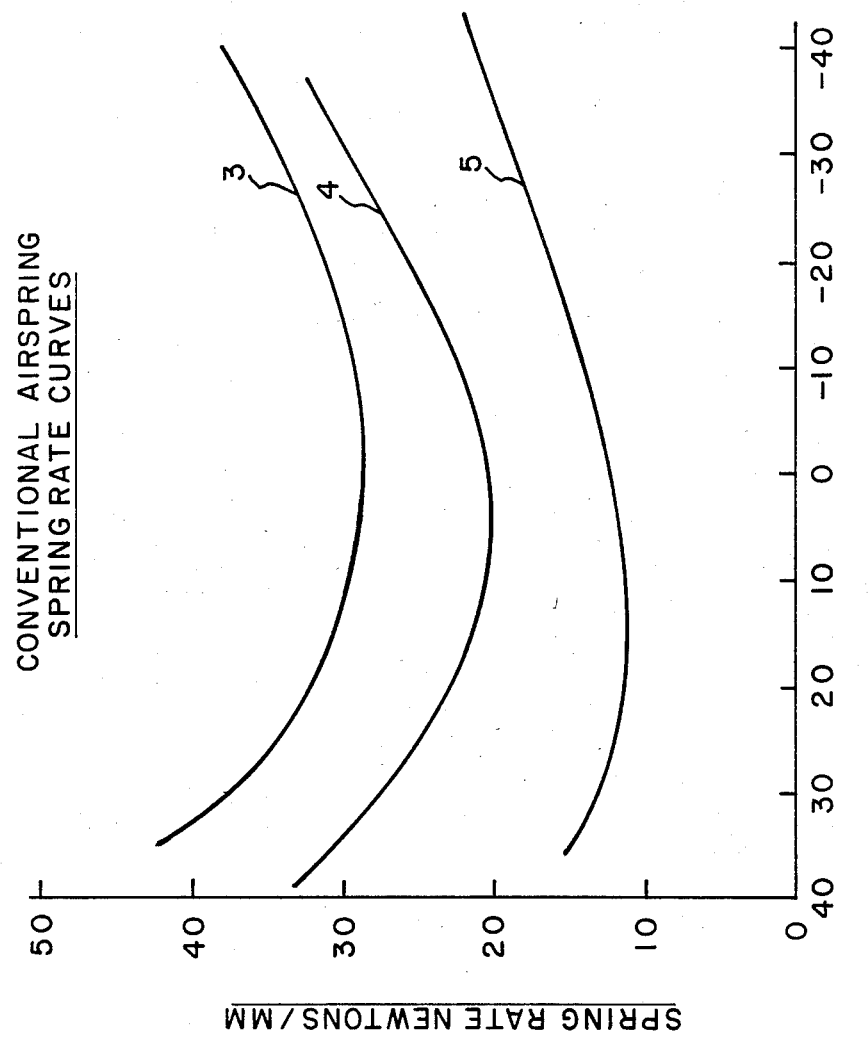
FIG. 7—spring rate curves—conventional air spring.

TABLE III
CONVENTIONAL AIR SPRING CHARACTERISTICS AND TESTING PARAMETERS
For Table IV, FIG. 6, FIG. 7

| Load Range | 8896 (N) |
| --- | --- |
| Pressure Range | 1723.75 (kPa) |
| Stroke Range | 101.6 (MM) |
| Stroke Amplitude | 76.2 (M) |
| Jounce | 38.1 (MM) |
| Rebound | 38.1 (MM) |
| Test Frequency | .5 (HZ) |
| Stroke Control | RAMP |
| Data Sampling Time | 10 (M SECONDS) |
| Design Height | 215.9 (MM) |

TABLE IV

| | Units | Test 3 | Test 4 | Test 5 |
| --- | --- | --- | --- | --- |
| Load @ Design Height | (N) | 3105 | 2219 | 1348 |
| Natural Frequency | (HZ) | 1.41 | 1.46 | 1.61 |
| Spring Rate @ Cycle 1.5 | (N/MM) | 25 | 19 | 14 |
| Pressure at Design Height | (KPa) | 457 | 338 | 218 |
| Effective Area @ DH | (MM²) | 6794 | 6570 | 6186 |

Figure 8:
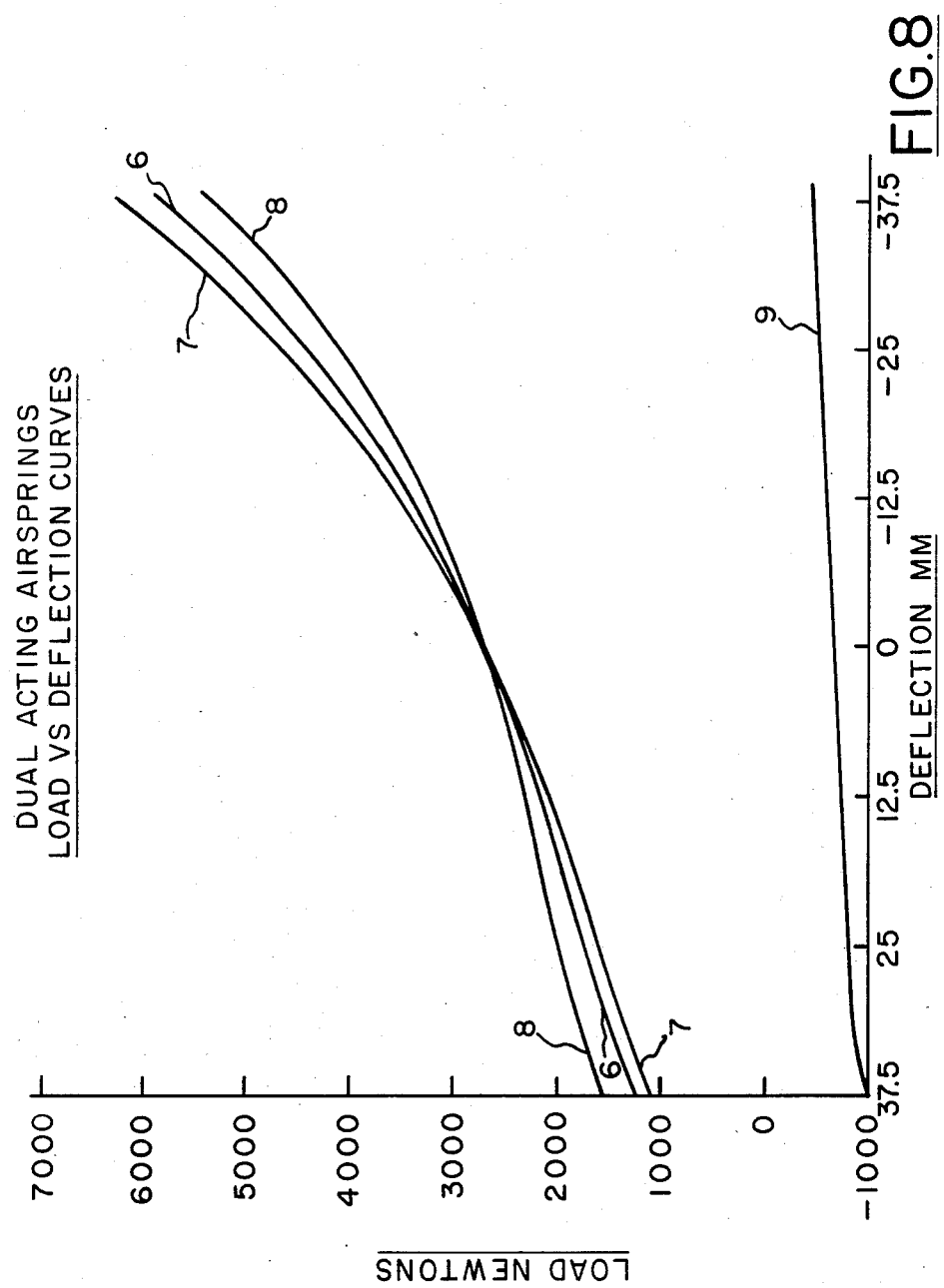
FIG. 8—load deflection curves—dual acting spring embodiment.
Figure 9:
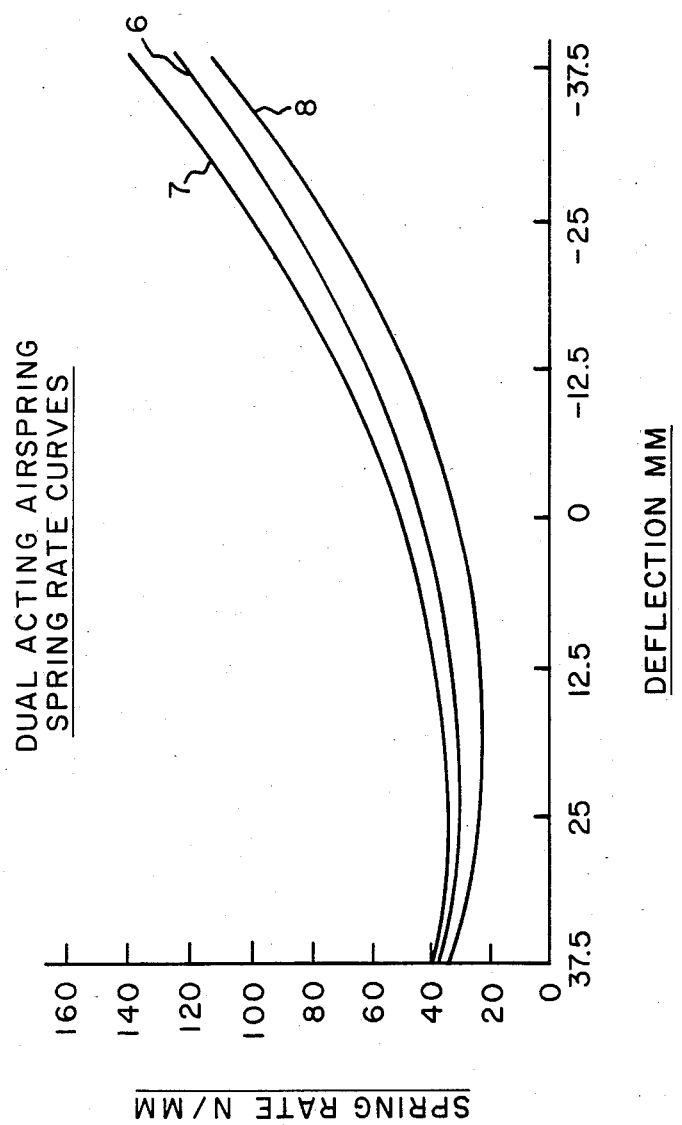
FIG. 9—spring rate curves—dual acting spring embodiment.

TABLE V
DUAL CHAMBER AIR SPRING CHARACTERISTICS AND TESTING PARAMETERS
For Table VI, FIG. 8 and FIG. 9

| Load Range | 44480 (NEWTONS) |
| --- | --- |
| Pressure Range | 1723.75 (KPa) |
| Stroke Range | 254 (MM) |
| Stroke Amplitude | 76.2 (MM) |
| Jounce | 38.1 (MM) |
| Rebound | 38.1 (MM) |
| Test Frequency | .5 (HZ) |
| Stroke Control | RAMP |
| Data Sampling Time | 10 (MSECS) |
| Design Height, DH | 355.6 (MM) |

TABLE VI

| | Units | Test 6 | Test 7 | Test 8 | Test 9 |
| --- | --- | --- | --- | --- | --- |
| Load @ Design Height | (N) | 2688 | 2682 | 2688 | −795 |
| Natural Frequency* | (HZ) | 2.08 | 2.27 | 1.85 | N/A |
| Spring Rate @ Cycle 2 | (N/MN) | 47 | 55 | 37 | N/A |
| Inner Chamber Pressure at DH | (KPa) | 415 | 480 | 345 | 0 |

TABLE VI-continued

|  | Units | Test 6 | Test 7 | Test 8 | Test 9 |
|---|---|---|---|---|---|
| Outer Chamber Pressure at DH | (KPa) | 193 | 427 | 0 | 412 |
| Effective Area @ DH | (SQ MM) | 6485 | 5585 | 7789 | −1928 |

*Natural Frequency = $15.76 \times (K/L)^{\frac{1}{2}}$ in cycles per second where K = Newtons per mm and L = newtons
N/A = Not Applicable FIG. 6 graphically shows the load vs. deflection curves for tests 3, 4 and 5, summarized in Table IV. FIG. 6 gives the actual test curves for the load deflection obtained on the prior art spring having the characteristics set out in Table III at the three test pressures. FIG. 7 is the differential curve derived from the load deflection curve and FIG. 7 shows the spring rate vs. the deflection for the conventional air spring. Comparison of curves of FIG. 6 and FIG. 7 clearly show that in a conventional air spring the spring rate is dependent upon the load on the air spring. This is to be contrasted with the surprising results of FIG. 5 which show spring rate for the dual chamber air spring of this invention to be independent of load.

DUAL ACTING EMBODIMENT

Another embodiment of the dual chamber pneumatic spring having an inner member resistant to radial compression was tested to illustrate: (a) the variable spring rate characteristics at constant load, and (b) its dual acting capability, that is to exert both compressive and extensive force. Table V contains the test conditions. Table VI sets out the test conditions for test runs 6–9. FIG. 8 gives the actual load versus deflection curves for test conditions 6–9. Curves corresponding to tests 6, 7 and 8 show that an extensive force is exerted by the air spring. The dual action capability of the spring is illustrated by the curve of test 9 in which an inner chamber was vented to the atmosphere (zero gauge pressure) while the outer chamber has 412 KPa. Throughout the stroke of the air spring a collapsing or compressive force was exerted by the spring; denoted by a negative load value of 795 Newtons at design height. This ability of the spring to exert a compressive force is unique in air spring configurations. Conventional air springs as exemplified in FIG. 2 are incapable of such an exertion of force since they normally serve to support a load such that the spring must exert an extensive force to counterbalance the compressive force of the load.

FIG. 9 shows the spring rate curves for tests 6, 7 and 8. The curves again illustrate in a similar manner to FIG. 4 that the air spring of this invention can give variable spring rates at constant load.

Strut Embodiment

Figure 10:
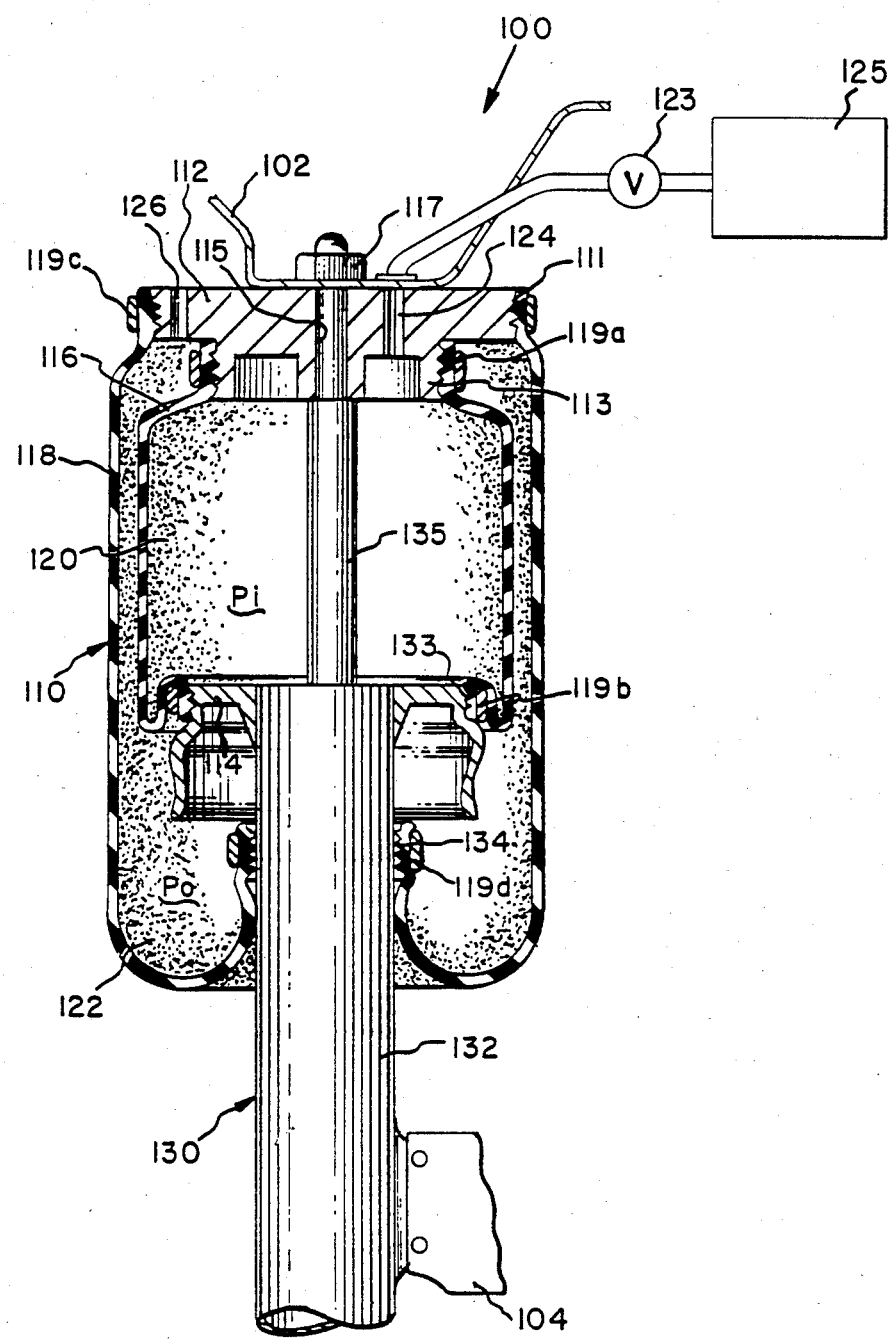
FIG. 10—a suspension member incorporating a dual chamber air spring.

FIG. 1 shows the present invention in its simplest form. An alternate embodiment is a suspension strut which requires the dual chamber air spring to be combined with a damping means to form a superior strut having variable spring rate capabilities. The damping means may be any of the conventionally known hydraulic or visco-elastic dampers or a conventional hydraulic shock absorber configuration. FIG. 10 shows an alternative embodiment in which the air spring of this invention is adapted for use in a suspension system as the connecting link between unsprung 102 and sprung portions 104 of the suspension. Referring now to FIG. 10, the suspension member which incorporates the air spring of this invention is generally referred to by reference numeral 100. The damping member 111 may preferably be a hydraulic shock absorber. The specific configuration shown in FIG. 10 is a suspension strut configuration in which the air spring generally referred to by reference numeral 110 is associated with a damping member 130. The damping member 130 functions as a means of damping oscillation in the suspension system. Any conventional damping means including a hydraulic shock absorber or a visco-elastic damper utilizing both hydraulic fluid and frictional damping forces. The particular damping member 130 illustrated in FIG. 10 is a conventionally known shock absorber having an outer strut tube 132 having a piston 114 fixedly attached to the upper axial end of the outer strut tube 132. The piston 114 and outer strut tube 132 have inner and outer circumferential attachment zones 133 and 134 respectively on their outer peripheral surfaces. Coaxially located within the strut tube 132 is an axially movable rod 135 which is connected to the damping means (not shown) within the damping member and connected at the other end to the retainer 112. The retainer 112 is thus free to axially move in relation to the piston 114. The retainer 112 includes on its outer peripheral surface an outer membrane attachment zone 111 and an inner membrane attachment zone 113. The inner membrane 116 and the outer membrane 118 are similar in all respects to inner membrane 16 and outer membrane 18 previously described. During assembly of the suspension member 100 the generally tubular inner membrane 116 is sealingly attached at one end by a suitable means as are conventionally known in the art. Means shown in FIG. 10 utilize a swage ring 119(a) which compresses and seals the inner membrane 116 between its inner surface and the inner membrane attachment zone 113 of the retainer 112. Similarly, the opposite end of the inner membrane 116 is attached by swage ring 119(b) to the lower circumferential attachment zone 134 of the piston 114. Any suitable means of fixedly attaching the rod 135 to the retainer 112 may be employed. A bore 115 is shown through which the rod is extended and affixed by the use of a fastener 117. The volume which is enclosed by the inner membrane 116 and the lower surface of the retainer 112 and upper surface of the piston 114 is the inner chamber 120. The outer membrane 118 is attached in similar fashion to the outer membrane attachment zone 111 and the lower circumferential attachment zone 133 of the strut tube 132. The means of sealingly attaching the outer membrane 118 is similarly shown to be by employing swage rings 119(c) and (d) to compress the inner membrane between the inner surface and the attachment zones 111 and 134. The annular cavity which is enclosed by the outer membrane 118 and the inner membrane 116 is the outer chamber 122.

A means for adjusting pressure 123 in at least one of the inner or outer chambers 120, 122 must be provided to derive the full benefit of the performance of this suspension member. Suitable pneumatic supply connections must be provided to the inner chamber 120 and/or the outer chamber 122. FIG. 10 shows that an inner chamber gas port 124 and an outer chamber gas port 126 which extend through the retainer 112. By supplying gas pressure from an external variable gas pressure supply source 125 the pressure of $P_i$ in the inner chamber may be controlled, and if desired, a second variable gas pressure supply source may be provided to maintain the pressure $P_o$ in the outer chamber at a desired level. The suspension member 100 with the air spring 110 coupled to a damping member 130 as shown in FIG. 10 provides an air strut suspension member in which the spring rate of the system may be nearly instantaneously adapted to alter the ride frequency or influence roll and pitch, depending upon force conditions exerted. The obvious application is in automotive suspensions, but it may similarly be applicable in any vehicular suspension. In the preferred operation mode of the suspension member 100, $P_i$ should be greater than $P_o$ which allows both membranes 116 and 118 to be made of flexible materials with no requirement for the inner membrane to withstand radial compressive force during operation.

A further advantage of the dual chamber air spring which is particularly useful in a suspension application is that if one cavity is accidentally ruptured, the other cavity will continue to support the load. Thus, a backup safety support system is built into this suspension design over conventional steel or air spring systems.

I claim:

1. An air spring with a centerline comprising: (a) an upper retainer; (b) a piston spaced axially away from the upper retainer; (c) an inner gas impervious membrane sealingly attached to the retainer and to the piston to form an inner cavity; (d) an outer gas impervious membrane sealingly attached to the retainer and the piston such that the inner membrane is completely encased by the outer membrane and forms an outer cavity between the outer membrane and inner membrane, the outer membrane and inner membrane each form a meniscus in axial cross section as the upper retainer axially approaches the piston, an effective diameter of each membrane equals twice the radial distance from said centerline to the point of the meniscus most axially distal the upper retainer, the effective diameter of the inner membrane being greater than the effective diameter of the outer membrane; (e) a means for introducing and exhausting gas pressure to at least one of said inner and outer cavities.

2. An air spring of claim 1, further comprising means for introducing and withdrawing pressurized gas to both the inner cavity and the outer cavity.

3. An air spring of claim 1 wherein said outer membrane is composed of a flexible elastomeric material having limited radial expansion.

4. An air spring of claim 1 wherein at least one of the outer membrane and the inner membrane is reinforced.

5. An air spring of claim 1 wherein the inner membrane is composed of a flexible elastomeric material capable of resisting radial force.

6. An air spring of claim 1 wherein the means for introducing and exhausting gas pressure is a two-way valve.

7. An air spring of claim 1 further comprising at least one external gas pressure source connected to the means for introducing and exhausting gas pressure.

8. An air spring of claim 7 further comprising a plurality of pressure sensors positioned in at least one of the inner and outer cavities and connected to said sensors, a means for controlling flow of gas from the gas pressure source.

9. A suspension system of claim 7 further comprising at least one variable gas pressure supply source connected to the air spring at the means for introducing and exhausing gas pressure.

10. A suspension system of claim 7 further comprising a means for controlling the amount of gas delivered to the inner and outer cavities.

11. A suspension system comprising: a plurality of spring members; a plurality of unsprung members; and an air spring having a centerline fixedly connected at one end to sprung members and fixedly connected at the opposite end to the unsprung members, said air spring having an upper retainer a piston spaced axially away from the upper retainer, an inner gas impervious membrane sealingly attached to the retainer and to the piston to form an inner cavity, an outer gas impervious membrane of larger diameter than the inner membrane sealingly attached to the retainer and the piston such that the inner membrane is completely encased by the outer membrane, thus forming an outer cavity between the outer membrane and inner membrane, the outer membrane and inner membrane each forming a meniscus in axial cross section as the upper retainer axially approaches the piston, an effective diameter of each membrane equals twice the radial distance from: the air spring centerline to the point of the meniscus most axially distal the upper retainer, the effective diameter of the inner membrane being greater than the said effective diameter of the outer membrane, a means for introducing and exhausting gas pressure to at least one of said inner and outer cavities.

* * * * *